Patented May 7, 1940

2,199,994

UNITED STATES PATENT OFFICE 2,199,994

VACUUM DISTILLATION

Kenneth C. D. Hickman, Rochester, N. Y., assignor, by mesne assignments, to Distillation Products, Inc., Rochester, N. Y., a corporation of Delaware No Drawing. Application November 13, 1937, Serial No. 174,491

5 Claims. (Cl. 202—52)

This invention relates to improvements in vacuum distillation processes, more particularly those carried out at relatively low pressures.

Of all forms of distillation, that which is called molecular distillation enables materials to be distilled at the lowest temperature with the least thermal damage. This is the great advantage of molecular distillation. Its disadvantages are numerous, the first one, from a scientific standpoint, being the poor separations which are produced by any single distillation operation. There are, however other drawbacks which may have great industrial significance. Very high speed vacuum pumps must be used to ensure a molecular vacuum and much more heat must be applied to the distilling column than is actually used to evaporate distillate. The excess heat is lost by radiation. Yet another drawback to the molecular still is that large size evaporators must be used to handle relatively small quantities of distilland.

This invention has for its object to provide a process whereby the above difficulties are overcome. A further object is to provide an improved method of vacuum distillation. Another object is to provide a vacuum distillation process which permits a higher rate of distillation per unit area of vaporizing surface. A still further object is to provide a method of vacuum distillation by which problems of vacuum production and maintenance are lessened. Other objects will appear hereinafter.

These and other objects are accomplished in accordance with my invention which in general comprises subjecting the substance to be distilled to distillation in an evacuated vessel containing a vaporizing zone and a condensing surface separated by substantially unconstricted space maintaining the vaporizing zone at a temperature sufficiently high to give a vapor stream of the distillate having a pressure of less than about 1 mm. of mercury and of such density that molecules of distillate collide more than five times on the average in passing from the vaporizing zone to the condensing surface, and maintaining the pressure of the residual gas at less than the pressure of the distilling molecules between the vaporizing zone and the condensing surface.

The invention contemplates operating in a vacuum still in which substantially free and unconstricted space exists between the zone in which distilling vapors are generated and the condensing surface. Ordinarily a still provided with a heated vaporizing surface and a cooled condensing surface will be employed. However, it is not necessary that a heated vaporizing surface be used since the material to be distilled can be heated and spun in space between two vaporizing surfaces as described in my copending application No. 99,632, filed September 5, 1936, or it may be sprayed into a body of heating vapors as described in my copending application No. 114,226, filed December 4, 1936.

When a heated vaporizing surface is to be used it can be in the form of an ordinary vertical gravity column preferably of short length in order to lessen decomposition. However, since mechanically actuated surfaces, such as described in my application No. 99,632, permit shorter distillation periods and avoidance of decomposition I prefer to employ them.

The condensing surface is so located that unobstructed space exists between it and the vaporizing surface or the zone of vaporization. Since my mode of operation results in a dense vapor stream reaching the condenser, it is apparent that the condensing surface must be of adequate size and present a sufficiently large area to adequately condense the vapor molecules. It is preferred that this surface be of approximately the same or many times greater area than the vaporizing surface and that it be approximately parallel therewith. However this is unnecessary and smaller surfaces such as down to one fifth that of the evaporating surface are useful, but less satisfactory.

During the distillation the vaporizing surface is heated to a temperature sufficient to yield a vapor stream of distillate having a density such that the molecules travel more than five times their mean free path in passing to the vaporizing surface. In most cases this corresponds to a saturation pressure of above about .005 mm. This value is roughly the lowest density stream across gaps of the customary width of 2-5 cm. which has the decided advantages over molecular distillation which have been pointed out, namely, high rate of distillation leading to high capacity of stills and reduced heat losses, etc. It also forms a lower limit of operation across such gaps clearly distinguished from molecular distillation which has been accepted as embracing vapor streams which traverse a distance less than five times the mean free path of the molecules during passage from the distilland surface to the condensing surface.

In distilling organic materials, according to my invention, the temperature of the vaporizing surface or zone should not, however, be elevated to an extent such that the pressure of the vapor stream between the evaporating and condensing surfaces is in excess of about 1 mm. Saturated distillate vapor pressures materially in excess of this value result in undue problems of decomposition and pumping and are not of value in most operations. As a general rule temperatures which give a saturation pressure which does not exceed .1 mm. are to be preferred.

It will be appreciated that the conditions specified above can be realized in a simple manner by "overrunning" an ordinary molecular still. The temperature of the distilling surface is raised higher than required for true molecular distillation so that more molecules leave the surface resulting in accelerated distillation which is the desirable feature of this invention. These molecules necessarily collide with one another in the gap but the average forward velocity or streaming velocity of the vapor remains substantially unimpaired. For the sake of clarity in distinguishing this form of distillation from molecular distillation, I have defined it as occurring when the molecules traverse a gap which is greater than five times their mean free path. The pressure of the advancing vapor will be related to the width of the gap and with large gaps pressures as low as .001 mm. will fall within the definition; with small gaps, such as five millimeters, a forward pressure of .02 mm. is about the lowest which we consider included within our invention.

It has been the common belief of those versed in the art of molecular distillation that operation of molecular stills under true molecular conditions is necessary to obtain an unburnt product. It is a feature of this invention that I have discovered the conditions under which many organic substances can be distilled without harmful alteration at speeds much higher than believed possible.

The residual gas pressure prevailing in the still must at all times be less than the saturation or vapor stream pressure. In other words, the pressure of residual gas in the space between the condensing and vaporizing surface must be sufficiently low that there will be fewer collisions of molecules of distillate with those of residual gas than with one another. With distances between these two surfaces of more than one centimeter and especially with channels of the order of a centimeter in width, but with a length of many centimeters, the distillate vapor will drive out into the ducts or prevent entrance of molecules of residual gas, provided always that the pressure of such molecules is less than that of the saturated pressure of the distillate molecules in the space or gap between the two surfaces. The residual gas pressure, whether measured between the two surfaces or in the evacuating ducts, must be below that of the vapor stream and can vary from about .0001 mm. to a gross upper limit of about 1 mm. or slightly below.

There are no limits to the distances of separation of the two surfaces. At lower pressures greater distances may be used than with the higher pressures where the gap should be narrower. It is to be understood, however, that narrow gaps can be employed with the lower pressures, although they are not always preferred. Distances of between 1/10 inches and 1 foot have been found to be most generally satisfactory, but greater distances, such as 2-5, or even 10 feet, are useful in particular cases, especially where a large storage space is necessary to accommodate bulky solids liberated during distillation.

The application of the higher temperatures necessary to give the high saturation pressure does not necessarily increase thermal decomposition. The efficiency and rate of distillation under high saturation pressure conditions is higher so that decomposition may be lessened by careful control of operations. The procedure has been found to be satisfactory for distilling substances such as have heretofore been distilled under molecular conditions, such, for instance, as animal and vegetable oils, sterols, hormones and hydrocarbons such as lubricating oils. Although it has been found to be fully satisfactory for distilling such sensitive substances as vitamins from fish liver and body oils, it is preferred to distill such materials from the oil under molecular distillation conditions or at the lower saturation and residual gas pressures mentioned above. The less easily decomposable constituents such as the fish oil itself, the free fatty acids, sterols, etc. can then be distilled under the conditions described especially with the intermediate and higher vapor saturation pressures.

By "overheating" as used in the claims, I mean heating to a temperature substantially higher than that required for true molecular distillation.

In general, the rate of thermal decomposition is proportional to a function of the temperature and time of exposure. If the time of exposure is cut down, the temperature may be raised safely. I contemplate applying this type of distillation to distillands which are maintained at the operating temperature for a relatively short time, such as when they are flowing over surfaces which are shorter than ordinarily employed in commercial molecular distillation or, alternatively, when they are carried over larger surfaces at greater rates than are ordinarily secured by gravitational flow. The means for securing this more rapid transfer has been described in my co-pending applications referred to above and in my application No. 166,856, filed October 1, 1937. This mode of operation is of particular value when recovering extremely sensitive substances.

Under molecular distillation conditions unlike gases can pass countercurrent to one another without interference, since in a highly evacuated space each gas behaves as if it were the only one present. Under the described conditions of operation this is not true and the great number of vaporized molecules emerging on the average at right angles from the distilling surface will drive before them the molecules of residual gas which will collect in the region of the condensing surface, the efficiency of which will be lowered. A remedy is to perforate or interrupt the condensing surface so as to permit the gases to pass away from the distilling zone and into the evacuating ducts. An apparatus suitable for this purpose would be constructed in the same manner as a conventional molecular still but a lattice or grid-like element would be interposed between the vaporizing element and the shell of the still. This grid would be cooled and molecules impinging thereon would be condensed and travel by gravity to the base thereof where they could be collected as condensate. The residual gas molecules would pass through the spaces and be removed by the pumps.

The use of my invention is especially valuable when fractional condensation is to be used to secure better separation of the constituents. Thus a plurality of concentric grid condensers may surround the vaporizing surface and each may be maintained at a chosen temperature. The grids nearer the center will be hotter and those nearer the outside will be cooler. A mixed vapor evolved from the central distilling surface will lose its least volatile constituents on the first grid and its other constituents in increasing order of volatility in the cooling grid sections. Manifestly, if an appreciable yield is to be obtained from the outermost grid, a relatively large quantity of vapor must be generated from the inner column, since portions of this vapor will be condensed in the passage through each grid.

*Example I*

In this example the dual process of molecular distillation followed by high saturation distillation is employed as applied to a fish liver oil, for instance, pollack liver oil. A continuous molecular still of a conventional design having a number of distilling columns is employed. The columns are maintained at successively higher temperatures. The pollack oil is admitted to the still and passes over the first column at a temperature of 110° C. and a residual gas pressure of 10 microns. It then passes over the column of the second still at a temperature of 180°, a residual gas pressure of 2 microns and a saturation pressure of distilling vapor of less than 1 micron. The space between the evaporating and condensing surface is less than 1 inch. The distilland now passes to the third still which is maintained at a temperature of 210°, a residual gas pressure of 1 micron, a saturated vapor pressure of 2 microns and a distilling gap of one inch. The distilland now passes to the fourth still where the temperature is raised to 250° C. The residual gas pressure is less than 1 micron and the saturation pressure of the distilling vapor is between 10 and 20 microns. In this still more than 50% of the distilland is evaporated. The residual distilland is passed to a fifth still, maintained at 270° C. where the residual gas pressure is 3 microns and the pressure of saturated vapor is 10 to 20 microns. In this still most of the material distills leaving 10% or less of the distilland to pass away as residue.

It will be appreciated that the first still was operated neither at molecular or pseudo molecular conditions because the pressure of the residual gas was greater than that of the distilling vapor. The second and third stills were operated under true molecular conditions and here the vitamins A and D were stripped off in the distillate fractions without substantial spoilage. In stills four and five rapid saturation distillation of the main bulk of fatty glycerides was taking place. The molecules of fat were suffering many collisions on an average more than five with one another before reaching the condensing surface, but were suffering fewer collisions with molecules of residual uncondensable gas. Some of this uncondensable gas may have remained gaseous at room temperature but much was uncondensable only under the conditions present in the distilling gap.

*Example II*

In this example the coloring matters, essential oils and sterols are separated from soy bean oil and the main bulk of the oil is distilled all under high saturation conditions. The soy bean oil is admitted to a centrifugal still containing a number of pairs of evaporating and condensing plates fixed to a common rotating shaft and located in a common chamber or vessel. The residual pressure in the vessel is approximately 5 microns and the space between the pairs of hot and cold plates is approximately one inch. The soy bean oil is previously freed from air and dissolved gases by passage through a suitable degasser and also from lecithin by suitable chemical treatment. The oil is admitted to the first plate which is maintained at a temperature of 150° C. A small quantity of distillate is obtained from the first revolving condenser. The oil is now passed to the second plate maintained at 200° C. and from thence it passes to a succession of distilling plates maintained at temperatures ascending to 290° C. The main bulk of glyceride distills from these latter plates at saturation pressures above 5 microns.

*Example III*

Rancid cocoanut oil is distilled in a five stage still as described in Example I. A residual gas pressure of 10 microns is maintained throughout all of the units of the still. The free fatty acids, products of rancidity, and the more volatile glycerides are evaporated at saturation pressures of 5–10 microns in the first three stills. Thereafter, the main bulk of glycerides are evaporated at temperatures of 235 and 265° and saturation pressures of 15 microns on the remaining two columns.

Since the invention permits distillation at residual gas pressures as high as 1 mm. it is apparent that the pumping problems are greatly simplified and that ordinary low capacity pumps can be satisfactorily employed. The use of high saturation pressures permits fractionation of the vapors to sharply segregate one constituent from another. This can be accomplished by the spaced lattice condenser described above or the high saturation vapor stream may be admitted to a wide admittance fractionating column of the nature described in my copending application No. 151,715, filed July 2, 1937. This constitutes a decided advance over the poor separations possible by molecular distillation. An outstanding advantage is the high rate of distillation possible per unit area of vaporizing surface as compared with the very slow rate possible with molecular distillation. For this reason much smaller equipment can be employed for equal or greater capacity. Since smaller vaporizing surfaces can be used with equal or greater distilling capacity and since the cool condensing surface can be at a distance of many times the mean free path, it is apparent that the heat input per unit volume of distilland treated and the heat losses by radiation are greatly reduced.

What I claim is:

1. The process of vacuum distillation which comprises heating a thin film of the organic substance which is to be distilled and condensing vaporized molecules upon a condensing surface which is separated from the thin film by substantially free unobstructed space, maintaining the pressure of residual non-condensed gas in the space between the film and the condensing surface at less than about 1 mm. by means of vacuum pumps, overheating the distilling substance so as to yield a vapor stream of the desired distillate having a vapor pressure of between .001 and 1 mm. of mercury, so that the molecules of vapor travel more than five times the mean free path in passing from the vaporizing film to the condensing surface, maintaining the residual non-condensed gas pressure lower than the pressure of the distilling vapors during the distillation, and limiting the time of exposure to heat in accordance with the overheating.

2. The process of vacuum distillation which comprises heating a thin film of the organic substance which is to be distilled and condensing vaporized molecules upon a condensing surface which is separated from the thin film by substantially free unobstructed space, maintaining the pressure of residual non-condensed gas in the space between the film and the condensing surface at less than about 1 mm. by means of vacuum pumps, overheating the distilling substance so as to yield a vapor stream of the desired distillate having a vapor pressure of between .005 and 1 mm. of mercury, so that the molecules of vapor travel more than five times the mean free path in passing from the vaporizing film to the condensing surface, maintaining the residual non-condensed gas pressure lower than the pressure of the distilling vapors during the distillation, and limiting the time of exposure to heat in accordance with the overheating.

3. The process of vacuum distillation in an evacuated vessel containing vaporizing and condensing surfaces, the latter surface being of substantially greater area than the vaporizing surface, and the space between the two surfaces being substantially unobstructed, which process comprises passing an organic distillable substance in a thin film over the vaporizing surface, maintaining the pressure of residual non-condensed gas in the space between the film and the condensing surface at less than about 1 mm. by means of vacuum pumps, overheating the distilling substance so as to yield a vapor stream of the desired distillate having a vapor pressure of between .001 and 1 mm. of mercury, so that the molecules of vapor travel more than five times the mean free path in passing from the vaporizing film to the condensing surface, maintaining the residual non-condensed gas pressure lower than the pressure of the distilling vapors during the distillation, and limiting the time of exposure to heat in accordance with the overheating.

4. The process of vacuum distillation which comprises heating a thin film of a fish oil which contains vitamins, and condensing vaporized vitamin molecules upon a condensing surface which is separated from the thin film of oil by substantially free unobstructed space, maintaining the pressure of residual non-condensed gas in the space between the film and the condensing surface at less than about 1 mm. by means of vacuum pumps, overheating the distilling film of fish oil so as to yield a vapor stream of the vitamin distillate having a vapor pressure of between .001 and 1 mm. of mercury, so that molecules of vitamin vapor travel more than five times the mean free path in passing from the film of oil to the condensing surface, maintaining the residual non-condensed gas pressure lower than the pressure of the distilling vapors during the distillation, and limiting the time of exposure to heat in accordance with the overheating.

5. The process of vacuum distillation in an evacuated vessel containing vaporizing and condensing surfaces separated by substantially unobstructed space, which process comprises causing the organic distillable substance to flow in a thin film by centrifugal force over the vaporizing surface, maintaining the pressure of residual non-condensed gas in the space between the film and the condensing surface at less than 1 mm. by means of vacuum pumps, overheating the distilling substance so as to yield a vapor stream of the desired distillate having a vapor pressure of between .001 and 1 mm. of mercury, so that the molecules of vapor travel more than five times the mean free path in passing from the vaporizing film to the condensing surface, maintaining the residual non-condensed gas pressure lower than the pressure of the distilling vapors during the distillation, and limiting the time of exposure to heat in accordance with the overheating.

KENNETH C. D. HICKMAN.